K. O. OLSEN.
BEVEL SQUARE FOR SHIPBUILDING.
APPLICATION FILED OCT. 1, 1918.
1,341,435.　　　　　　　　　　　Patented May 25, 1920.
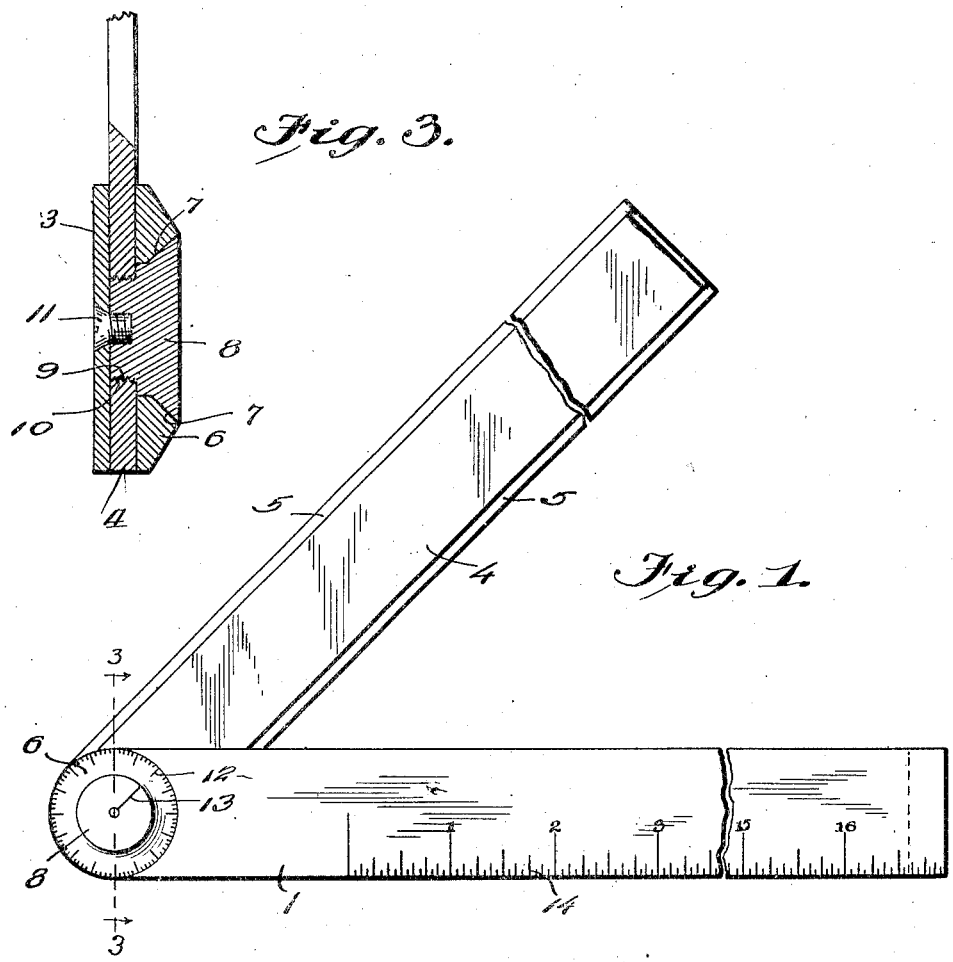
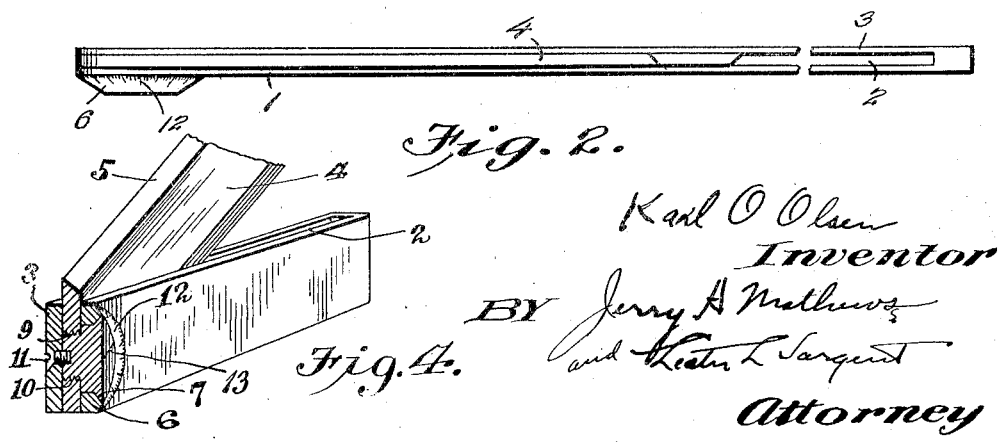
Karl O. Olsen
Inventor
BY Jerry A. Mathews
and Lester L. Sargent
Attorney

UNITED STATES PATENT OFFICE.

KARL O. OLSEN, OF ST. HELENS, OREGON.

BEVEL-SQUARE FOR SHIPBUILDING.

1,341,435.　　　　　Specification of Letters Patent.　　Patented May 25, 1920.

Application filed October 1, 1918. Serial No. 256,396.

*To all whom it may concern:*

Be it known that I, KARL O. OLSEN, a citizen of the United States, residing at St. Helens, in the county of Columbia and State of Oregon, have invented a new and useful Bevel-Square for Shipbuilding, of which the following is a specification.

It is my object to provide a bevel square that will obviate much labor on the part of workmen engaged in shipbuilding, said square having the required markings for use in shipbuilding and having means for readily reading these markings. I attain the objects of my invention by the instrument shown in the accompanying drawings, in which—

Figure 1 is a face view of the invention; Fig. 2 is an edge view; Fig. 3 is a section on line 3—3 of Fig. 1 and Fig. 4 is a perspective detail view of the device, partly in section.

Like numerals designate like parts in each of the views.

Referring to the accompanying drawings, I provide arms 1 and 3, between which is a slot 2, into which the arm 4 is adapted to be moved. A pivot member 8 engages and moves in unison with arm 4. A suitable screw 11 adjustably holds arm 3, pivot 8 arm 1 and arm 4 in operative relation, the head of the screw being rotatable relative to arm 3.

Arm 4 is shorter than members 1 and 3, so as to close into the slot 2, as shown in Fig. 2. Arms 1 and 2 form one integral piece as illustrated in Fig. 2. As shown in Figs. 2 and 3, I provide on the end of arm 1 and integral therewith an annular raised portion 6 bearing on its face the ship's degrees or markings used in shipbuilding, and designated 12, the circle being divided into 80 parts for this purpose. The pivot member 8 has an outwardly slanting bevel face 7 bearing against member 6 which is integral with member 1, as shown in Fig. 3. Member 8, has a threaded portion 9 securing it in rigid engagement with threaded portion 10 of arm 4, or in other suitable manner, so that the indicator line 13 on the face of member 8, which is disposed parallel with arm 4 will indicate on dial markings 12 the bevel to which arm 4 has been moved. I may provide arm 4 with bevel faces 5, as shown in Fig. 1.

The instrument is especially designed for the use of shipbuilders, and is intended to supplant the present method of employing a common bevel square to measure with and then laying the bevel square on a board marked with the ship degrees. In using my instrument, the degrees are shown on the square and the number of degrees to which the bevel arms are moved is indicated by the channeled indicator line 13.

After the ribs of the ship have been erected it is customary to measure the timbers by means of a board which has the degrees marked on it in connection with a bevel square, as each timber has to be sawed to a different shape. This method of determining the measurements is a tedious one. I apply my square directly on the rib of the ship to determine the degrees at which the adjoining timbers are to be sawed, and obviate the use of marked board heretofore used in taking measurements. As my device does not vary in its measurements nor become worn so as to effect its exactness, greater accuracy of measurement is possible and timbers may be sawed accurately to the degrees indicated on my square. With the former practice timbers often had to be resawed to secure the necessary accuracy, thus doubling the expense of building.

I am aware that various squares having indicator devices have heretofore been invented, but these squares and indicators by reason of their arrangement and lack of required markings are not suited for the use of shipbuilders.

What I claim is:

1. A bevel square for shipbuilders adapted to instantly indicate angles at which the instrument is set, comprising integral arms having a slot extending substantially the entire length between the arms, the arms having suitable graduations, an annular raised portion at the end of one of the said arms and integral therewith said raised portion having opposed annular beveled faces and having marks designating ship's degrees on its outer annular face, a third arm pivotally attached to the two first mentioned arms and adapted to be moved into the slot between said spaced arms, and a pivot member bearing an indicator line on its face said line being disposed in a direction parallel to the single third arm, the pivot member having a slanting face bearing against the corresponding face of the annular raised portion above described, and means for adjustably attaching the respective arms and pivot member, whereby to cause the pivot member to rotate in unison with the single third arm, substantially as shown and described.

2. A bevel square for shipbuilding use adapted to instantly disclose the angle at which its measuring arms are adjusted, comprising two spaced integral arms having a long slot extending therebetween, a third arm pivotally attached to the first mentioned arms at their open end and adapted to be moved into the slot therebetween, annular indicator means integral with one of the two first mentioned spaced arms at the end to which the second mentioned arm is pivoted, an annular pivot member in threaded engagement and rotating with the second mentioned arm, said member having an indicator line on its face disposed in a direction parallel with the third arm and adapted to point to the degrees on the annular indicator member corresponding with the angle at which the respective arms are adjusted, and fastening means loosely attaching the pivot member to one of the spaced arms, to permit of the third arm and pivot member being rotated relative to the spaced arms, substantially as and for the purposes described.

KARL O. OLSEN.